United States Patent
Fetzer et al.

(10) Patent No.: US 10,195,694 B2
(45) Date of Patent: Feb. 5, 2019

(54) METHOD FOR MANUFACTURING A SYNCHRONIZING RING AND PROGRAM

(71) Applicant: AKTIEBOLAGET SKF, Göteborg (SE)

(72) Inventors: Thomas Fetzer, Denkingen (DE); Norbert Huhn, Schweinfurt (DE); Ulrich Lang, Mühlheim (DE); Patrice Ribault, Vouvray (FR)

(73) Assignee: Aktiebolaget SKF, Göteborg (SE)

( * ) Notice: Subject to any disclaimer, the term of this patent is extended or adjusted under 35 U.S.C. 154(b) by 920 days.

(21) Appl. No.: 14/417,579

(22) PCT Filed: Jul. 11, 2013

(86) PCT No.: PCT/EP2013/064717
§ 371 (c)(1),
(2) Date: Jan. 27, 2015

(87) PCT Pub. No.: WO2014/016138
PCT Pub. Date: Jan. 30, 2014

(65) Prior Publication Data
US 2015/0251276 A1    Sep. 10, 2015

(30) Foreign Application Priority Data

Jul. 27, 2012   (DE) ................ 10 2012 213 226

(51) Int. Cl.
*C21D 1/09*   (2006.01)
*B23K 26/38*  (2014.01)
(Continued)

(52) U.S. Cl.
CPC .............. *B23K 26/38* (2013.01); *B23P 15/00* (2013.01); *C21D 1/09* (2013.01); *C21D 9/40* (2013.01);
(Continued)

(58) Field of Classification Search
None
See application file for complete search history.

(56) References Cited

U.S. PATENT DOCUMENTS 6,454,877 B1    9/2002 Kumar et al.
2012/0030929 A1   2/2012 Merklein et al.

FOREIGN PATENT DOCUMENTS

CN    101096786 A    1/2008
CN    101410221 A    4/2009
(Continued)

OTHER PUBLICATIONS

Machine translation of EP0902206A1, May 1999.*
(Continued)

*Primary Examiner* — Xiaowei Su
(74) *Attorney, Agent, or Firm* — Bryan Peckjian; SKF USA Inc. Patent Dept.

(57) ABSTRACT

A method for manufacturing at least one synchronizing ring includes providing a rough-turned blank made from a hard-enable material that is in a not-hardened state and laser-cutting the rough-turned blank to form the at least one synchronizing ring, the laser cutting being performed with an energy chosen to be sufficient to selectively harden at least a portion of the material in a region along which the laser cutting occurs.

12 Claims, 3 Drawing Sheets

(51) Int. Cl.
    *B23P 15/00*     (2006.01)
    *F16D 23/02*     (2006.01)
    *C21D 9/40*     (2006.01)
    *B23K 101/30*     (2006.01)

(52) U.S. Cl.
    CPC ........ *F16D 23/025* (2013.01); *B23K 2101/30* (2018.08); *C21D 2261/00* (2013.01); *F16D 2250/00* (2013.01); *F16D 2250/0053* (2013.01)

(56) References Cited

FOREIGN PATENT DOCUMENTS

| | | | | |
|---|---|---|---|---|
| DE | 19537209 | A1 | 4/1997 | |
| DE | 102006016348 | A1 | 10/2007 | |
| DE | 102010009818 | A1 | 9/2011 | |
| DE | 102006006024 | | 12/2013 | |
| EP | 0902206 | A1 * | 3/1999 | ............. F16D 1/072 |
| JP | 60200909 | A * | 10/1985 | ............... C12D 1/09 |
| JP | H04049238 | A | 1/1992 | |
| JP | H08168845 | | 7/1996 | |
| WO | 2007090552 | A1 | 8/2007 | |

OTHER PUBLICATIONS

Machine translation of CN101410221A, Apr. 2009.*
Machine translation of JP60-200909, Oct. 1985.*
International Search Report from PCT/EP2013/064717.

* cited by examiner

METHOD FOR MANUFACTURING A SYNCHRONIZING RING AND PROGRAM

CROSS-REFERENCE

This application is the U.S. National Stage of International Application No. PCT/EP2013/064717 filed on Jul. 11, 2013, which claims priority to German patent application no. 10 2012 213 226.0 filed on Jul. 27, 2012.

TECHNOLOGICAL FIELD

Exemplary embodiments relate to a method for manufacturing at least one synchronizing ring and to a program including a program code for performing such a method. The program can be executed, for example, on a programmable hardware component, for example, a machine tool, and in particular on a laser-cutting machine and/or a laser-hardening machine.

BACKGROUND

In the motor vehicle field, synchronizing rings, which include, for example, synchronizing intermediate rings and synchronizing inner rings, are used in synchronization devices or synchronizers of fixed-gear ratio transmissions in drive trains of vehicles. They provide a rotational speed compensation for components of a transmission which are rotating with different rotational speeds with respect to one another. These can include, for example, a synchronizing body, an idler and a sliding sleeve. However, corresponding synchronizations can also occur in the field of electronically shifted transmissions, for example automatic transmissions, dual-clutch transmissions, and other corresponding change-speed transmissions.

DE 2006 006 024 A1 thus relates to a method for manufacturing of rings and intermediate rings for a synchronization device, such as are usable, for example, in manually shiftable gear-change transmissions. It mentions, for example, a beam cutting, for example using a laser beam.

Due to recent developments in the synchronization field it has become possible to use synchronizing rings which make possible, even with lower precision requirements, a reliable operation of the associated synchronizations. The now-slightly-reduced requirements in precision and the corresponding manufacturing precision can thus optionally also be used to manufacture the synchronizing rings using a simpler and thus more economical method.

There is therefore a need to provide such a simpler method for manufacturing a synchronizing ring.

SUMMARY

A method for manufacturing at least one synchronizing ring according to an exemplary embodiment comprises providing a pre-machined or pre-turned blank made from a hardenable material that has not been hardened, and laser-cutting the provided blank, in order to provide at least one form of the at least one synchronizing ring.

A method according to an exemplary embodiment is thus based on the recognition that a simplifying of the manufacturing of a synchronizing ring is achievable, since based on a rough-turned blank made from a hardenable material, which is, however, in a not-hardened state, using laser-cutting an appropriate synchronizing ring is manufacturable, in many cases fully, at the very least, however, at least partially. If it is not fully manufacturable, then the laser-cutting can, however, give it its substantially final form, which is only slightly changed—if at all—by subsequent processing steps. The use of laser-cutting of, namely, a rough-turned blank, which, however, is not in a hardened state, can realize here the aimed-for simplifying of the manufacturing of the synchronizing ring, since complex and thus often cost-intensive manufacturing steps can be spared.

A synchronizing ring here can, for example, be a synchronizing inner ring, a synchronizing intermediate ring, or another synchronizing ring. A synchronizing inner ring can, for example, be used in a multiple synchronization.

The laser-cutting can be performed such that the hardenable material is hardened in the region of the blank where the laser-cutting occurred. The hardening occurring here, which is also referred to as laser-hardening due to the use of the laser, is a local hardening of the specific portion of the synchronizing ring where the laser cutting occurred rather than a hardening of the entire synchronizing ring.

The form of the synchronizing ring here represents an outer form thereof, i.e. a contour delimiting its volume. With respect to the outer design of the later synchronizing ring, its form is thus substantially defined by the laser-cutting.

In a method according to an exemplary embodiment, the laser-cutting can optionally occur such that here the synchronizing ring includes in the cut area at least one load surface extending perpendicular to a circumferential direction. Even when a complete hardening of the synchronizing ring can optionally be omitted, it can be advisable, however, possibly even necessary, to harden this at least sectionally. Such a method can be interesting, for example, also in optional multi-implemented load surfaces of the synchronizing ring, which often extend perpendicular to the circumferential direction thereof. These can arise, for example, on the sections of lugs or other projections on the synchronizing ring, which sections are disposed in the circumferential direction, on which sections high retaining forces and/or pulsating loads can occur, due to which there can be a risk of flattening-out of soft rings. Since the corresponding load surface is now disposed in the cut area of the laser-cutting, by using a method according to an exemplary embodiment the appropriate resistance to corresponding mechanical loads can be improved or achieved since the corresponding hardening occurs exactly in the cut area.

A method according to an exemplary embodiment can thus optionally occur without vibratory finishing. Alternatively or additionally, the providing of the blank can also comprise a providing thereof without vibratory finishing. Last but not least, using such a measure the aimed-for simplification can thus be achieved, for example.

In a method according to an exemplary embodiment, the laser-cutting of the provided blank can optionally follow a laser-cutting with a specific energy which corresponds to at least 105% of a minimum specific energy required for laser-cutting the blank. Here the specific energy represents an amount of energy based on a unit of length for cutting the blank in question. It can be specified, for example, in SI units in J/m as the ratio of an amount of energy (J=joule) and the length (m=meter). It can be specified, for example, as a quotient of a laser power P used for cutting and a cutting speed v by which the laser or its output point on the blank is moved thereover. Due to the targeted increase of the specific energy used for the laser-cutting with respect to the minimum specific energy required for the laser-cutting of the same, a hardening of the blank or of the resulting synchronizing ring can thus be improved. Depending on the specific requirements and designs, it can thus possibly also be advisable to use at least 110%, at least 115%, or at least 120% of the minimum specific energy required for laser-cutting the blank.

A method according to an exemplary embodiment can optionally further comprise a separate laser-hardening following the laser-cutting. In this way it can optionally be possible to adapt the hardening of the synchronizing ring to an even finer degree to the expected mechanical loads.

In such a method according to an exemplary embodiment, the laser-hardening can optionally occur without reclamping. The same machine tool which was is also used for laser-cutting can thus be used for performing the separate laser-hardening. Here the same laser can optionally even be used if this is operated, for example, with a lower power. As a result, despite a separate laser-hardening, which initially represents an additional method step for manufacturing the synchronizing ring, the manufacturing and machine expense can be further simplified.

Compared to other hardening methods, the separate laser-hardening here can simplify the complete method for manufacturing the at least one synchronizing ring, since expensive post-processing steps associated therewith can optionally be avoidable.

In a method according to an exemplary embodiment which comprises a step of separate laser-hardening, the laser-hardening can optionally comprise a defocusing of a laser optics system so that the laser-hardening occurs with a defocused laser beam in comparison to the laser-cutting. It can thereby not only be possible to harden a larger surface in comparison to the cut surface; an adapting of a laser power used for laser-hardening in comparison to a laser power used for laser-cutting can also be omitted or at least reduced. In this way a simplification of the manufacturing of synchronizing rings can thus also be achieved.

In a method according to an exemplary embodiment, the manufacturing of the at least one synchronizing ring can thus optionally occur such that the at least one manufactured synchronizing ring has a roundness shape tolerance of at most 100 µm. Here the roundness shape tolerance represents a measure for a maximum permissible deviation of the synchronizing ring from its idealized shape. It is defined such that the relevant sections of the synchronizing ring, to which the roundness shape tolerance relates, lie along a plane perpendicular to an axis of symmetry between a minimum and a maximum circle or circular arc which are spaced from each other by the roundness shape tolerance. In exemplary embodiments of such a method, however, the roundness shape tolerance can be at most 90 µm, at most 80 µm, at most 70 µm, at most 60 µm, at most 50 µm, or at most 40 µm. Due to the use of the rough-turned blank made from the hardenable material and the use of laser-cutting, the above-mentioned roundness values can thus be realizable in different exemplary embodiments optionally without additional cost-intensive method steps.

A synchronizing ring thus typically has an axis of symmetry which often completely, but at least substantially, coincides with its axis of rotation in the later use thereof. With respect to this axis of symmetry, the synchronizing ring therefore often sectionally has a complete rotational symmetry; with respect to its shape as a whole, often a whole-number rotational symmetry.

A component can, for example, have an n-fold rotational symmetry, wherein n is an integer greater than or equal to 2. An n-fold rotational symmetry exists if the component in question can be rotated about an axis of rotation or symmetry by (360°/n) and still look the same, i.e. upon a corresponding rotation it is substantially mapped onto itself in the mathematical sense. In contrast, with a completely rotationally symmetric embodiment of a component, with any turn of any angular extent about the axis of rotation or symmetry, the shape of the component remains the same, i.e. is substantially mapped onto itself in the mathematical sense. Both n-fold rotational symmetry and full rotational symmetry are referred to herein as rotational symmetry.

However, it may also be possible to manufacture a synchronizing ring using a method according to an exemplary embodiment without an explicit whole-number symmetry.

A method for manufacturing at least one synchronizing ring can optionally further comprise a coating with a coat, for example a carbon coat, a carbon-based coat, or another coat. The coating can comprise, for example, a spraying, an adhering, a spin-coating, or also another form of coating. Here the coat can be applied, for example, as paint, powder, emulsion, or in another form. Depending on the exemplary embodiment, such a method can take place here before or also after the laser-cutting. Thus, for example, the blank can therefore be cut in a coated form using the laser-cutting.

A method for manufacturing at least one synchronizing ring can optionally further comprise, prior to the laser-cutting, a treatment, for example a surface treatment, wherein before the laser-cutting a treatment layer or a coat is applied at least partially to the blank, in order to, for example, make possible a better energy absorption or also an improved material ablation during the laser-cutting. Such a treatment can thus comprise, for example, a spraying-on of a paint, to name only one example. In this way it can be possible to improve the energy absorption during laser-cutting, by, for example, improving an absorption behavior with respect to the laser beam used in laser-cutting. In such a case an exemplary embodiment of a method can also comprise a removing after the laser-cutting of a treatment layer applied during treatment, wherein this optionally need not occur immediately after the laser-cutting.

An exemplary embodiment further comprises a program including a program code for performing such a method according to an exemplary embodiment, when the program runs on a programmable hardware component, for example a machine tool and here in particular on a laser-cutting machine and/or laser-hardening machine. The individual method steps can be achieved here by controlling corresponding actuators. In the context of such a program, however also in the context of other implementations of a method according to an exemplary embodiment, the individual method steps can thus comprise a generating, providing, and optionally receiving of control signals, sensor signals, and other signals. The sending can also comprise a writing or storing of a value in a storage location or a register. Accordingly a reading or a receiving can also comprise a corresponding reading of a register or of a storage location. These signals can be transmitted, for example, as electrical, optical, or radio signals and formed continuously or discrete from one another independent of their signal values and their temporal arrangement. The corresponding signals can thus comprise, for example, analog signals, however also digital signals.

A "one-piece component" is understood to mean a component that is manufactured from exactly one continuous piece of material. The term "one-piece" can therefore be synonymously used with the terms "integral" or "one-part." A "mechanical coupling" of two components comprises both a direct and an indirect coupling. Electrical or other components are coupled indirectly here via a further component or directly to one other such that they make possible a signal exchange between the relevant components. The corresponding coupling can thus be sectionally or completely introduced and implemented, for example, electrically, optically, magnetically, or using radio technology.

In an exemplary embodiment of such a method, the above-mentioned method steps can be performed in the specified, however also optionally in a deviating, order. Individual method steps can thus optionally occur simultaneously, however at least temporally overlapping, provided nothing different results from their description or the technical context.

BRIEF DESCRIPTION OF THE DRAWINGS

Despite the word "direction," in the present case each individual "direction" is not necessarily a direction in the mathematical sense of a vector, but rather a line along which the corresponding movement occurs. Such a line can be straight, but can also be curved. To be distinguished here are directions which are actually directions along a line, for example, the direction of movement. Thus, for example, a first direction can oppose a second direction, but both may extend or be oriented along a line which is also designated as a direction.

Exemplary embodiments are described and explained in more detail below with reference to the accompanying Figures.

DETAILED DESCRIPTION

Figure 1:
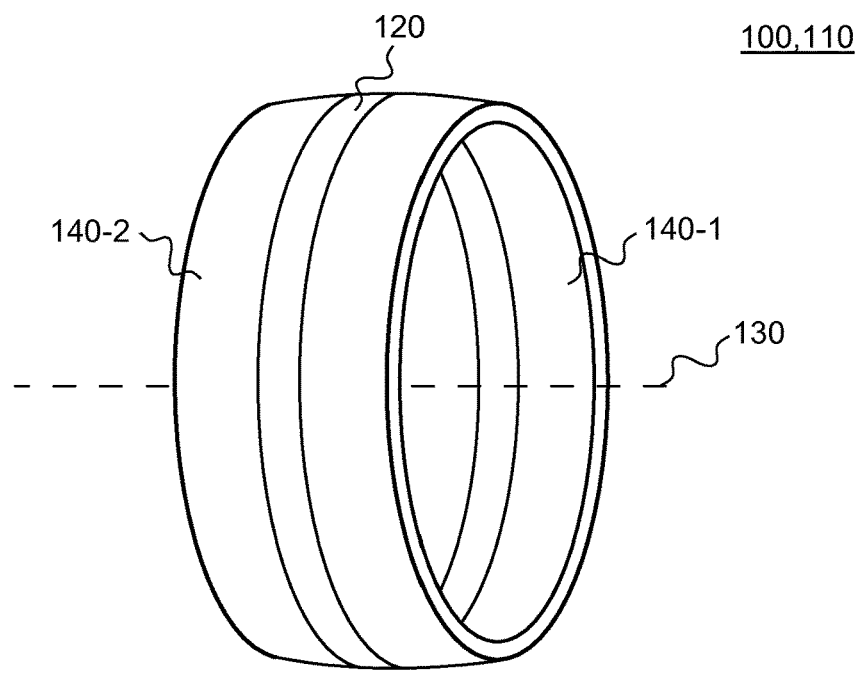
FIG. 1 shows a perspective depiction of a blank in the form of a double ring.

In the following description of the accompanying Figures, like reference numerals refer to like or comparable components. Furthermore, summarizing reference numerals are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

As was mentioned briefly at the outset, in the synchronization field, due to new developments, synchronizing rings can now be used which have lower precision and manufacturing tolerances than was conventionally the case. These developments allow the use of new manufacturing methods for producing synchronizing rings which methods are simpler and more cost-effective than conventional manufacturing methods but which methods at the same time are capable of meeting the new, reduced, precision and/or tolerance requirements.

In the synchronization field today, synchronizing rings can thus be used which do not require the precision achievable by a grinding operation and can accordingly be manufactured more cost-effectively. A manufacturing precision achievable by turning or stamping can thereby suffice for the manufacturing and use of such a ring. In addition it can optionally also be possible to allow a complete hardening of the synchronizing rings to be omitted, since a warping results from the hardening which can negatively influence usage.

However, synchronizing rings often include lugs or other projections on which high retaining forces as well as pulsating loads can occur which the synchronizing ring must withstand. Due to these and possibly other mechanical loads there is a risk here of a flattening-out with the use of soft rings. The use of a partial hardened layer can therefore be advisable, possibly even necessary, at least in the region of such load surfaces.

Conventionally, synchronizing rings are manufactured from hardened steel using laser-cutting technology. Here a so-called double ring is turned from the relevant raw material, subsequently hardened, ground, and then separated by laser. Although this process has advantages in terms of manufacturing technique, it is, however, not uncomplicated with respect to its process management. The conventional process can thus make possible a low hardening-warping as well as a processing of a blank suited for two synchronizing rings in the context of the double-ring processing. Likewise, low tool costs can optionally be achieved by the use of laser-cutting in comparison to a single-part production by stamping, wherein the relevant synchronizing rings are thus produced as stamped parts.

That is, for example, individually stamped rings are thus conventionally used wherein an inductive hardening process is used in the region of the lugs. However, this method has high tool costs for the stamping tool, so that especially with moderate batch sizes a high tool-cost component per manufactured work piece can accrue. Such a method can thus possibly lead to additional costs and thus to less-competitive manufacturing.

Exemplary embodiments of a method for manufacturing at least one synchronizing ring can thus make possible an integrated manufacturing and a surface treatment in the context of a single process. It can thereby optionally be possible to reduce a handling expense, process time, and process costs, and thus realize a cost advantage. As will be explained below, an exemplary embodiment of such a method is often based on a partial laser-hardening of a soft synchronizing intermediate ring. In exemplary embodiments soft intermediate synchronizing rings can thus be manufactured using a laser-cutting process wherein the same process is also used for heat treatment of the surface in order to achieve the required surface hardness and resistance. By using such a technology, cost advantages can optionally be achieved if, for example, the rings are coated with a carbon-containing coat by a coating or adhering. In such a case the synchronizing rings can thus optionally only serve as substrate for an appropriate coat.

FIG. 1 shows a perspective depiction of a blank 100 in the form of a double ring 110. Here the blank 100 is prefabricated as a rough-turned part and has thus, for example, not undergone a vibratory finishing process.

Here the blank 100 has a central region 120 and respectively a substantially hollow-truncated-conical section 140-1, 140-2 along an axis of symmetry 130, with respect to which the blank 100 has a complete rotational symmetry.

Here the blank 100 is produced from a hardenable metal, for example an appropriate hardenable steel However, at this production stage, the material from which the blank 100, that is, ring 110, is formed has not yet been hardened.

Neither—as was already mentioned—has a vibratory finishing process been applied in advance for tempering its surface.

The blank 100, as is depicted, for example, in FIG. 1, which is rough-turned and produced from a hardenable material, however is not already in a hardened state, can thus initially be provided in the context of an exemplary embodiment of a method for manufacturing at least one synchronizing ring before the blank 100 is then brought, using laser-cutting, at least into a form of the later synchronizing ring.

Figure 2:
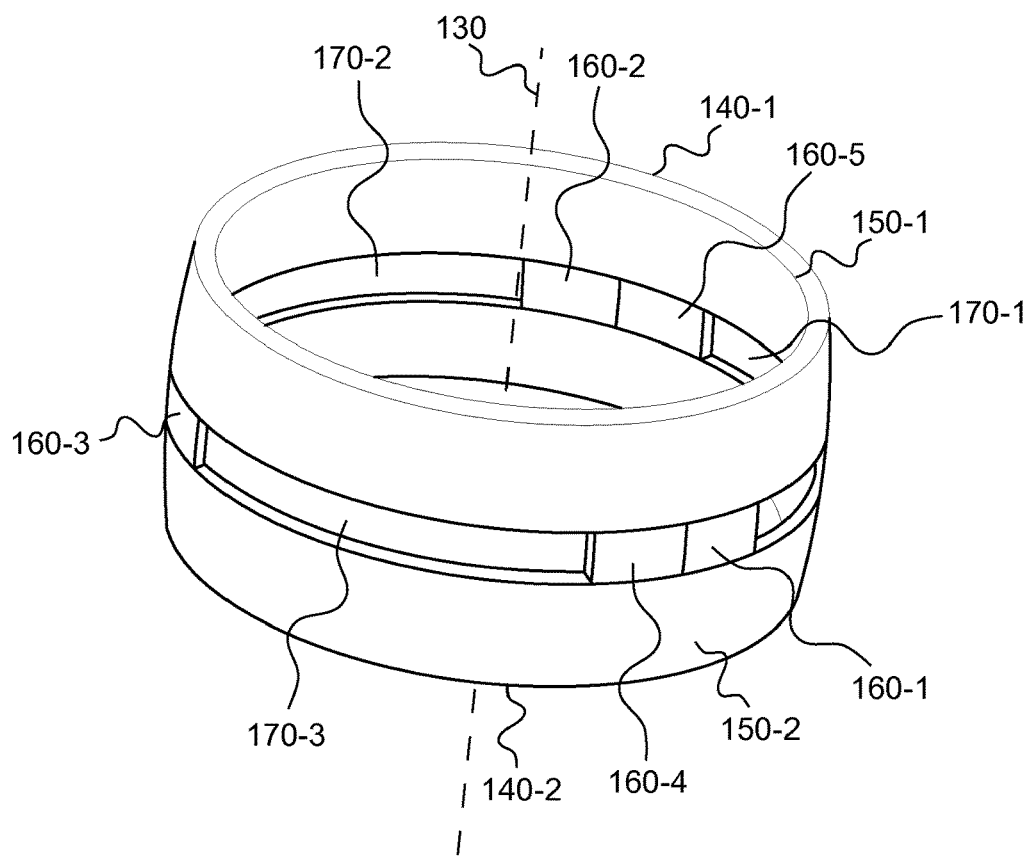
FIG. 2 shows a perspective view of two manufactured synchronizing rings after the laser-cutting of the blank.

FIG. 2 thus shows a perspective depiction of two synchronizing rings 150-1, 150-2 which were provided using laser-cutting from the blank 110 shown in FIG. 1. More specifically, the synchronizing rings 150, as shown in FIG. 2, are synchronizing intermediate rings. However, in other exemplary embodiments a synchronizing ring can also be a synchronizing inner ring or another synchronizing ring 150. Without limiting the generality, in the following only synchronizing intermediate rings are considered as synchronizing rings 150. However, exemplary embodiments can also be used for manufacturing or providing other types of synchronizing rings 150.

Here during the laser-cutting the central region 120 is removed to a large extent from the blank 100. Only a plurality of projections 160-1, . . . , 160-6 remain here which are each connected to one of the hollow-truncated-conical sections 140. These were separated from the respective other hollow-truncated-conical sections 140 by the laser-cutting.

Likewise, regions of the central region 120 have been removed by the laser-cutting in order to form corresponding openings 170-1, 170-2, and 170-3.

In this way two synchronizing rings 150-1, 150-2, based on such a double ring 110 as the blank 100, result from the laser-cutting, which synchronizing rings 150-1, 150-2 each have a hollow-truncated-conical section 140 and, in the present exemplary embodiment shown, respectively three projections 160, which are also referred to as lugs. More specifically, here the synchronizing ring 150-1 comprises, in addition to the hollow-truncated-conical section 140, the projections 160-1, 160-2, and 160-3, which are integrally connected to the hollow-truncated-conical section 140. The projections 160 and the hollow-truncated-conical sections 140 of each of the two synchronizing rings 150 are thus embodied one-part.

The synchronizing ring 150-2 accordingly includes the hollow-truncated-conical section 140-2 as well as the projections 160-4, 160-5, and 160-6, wherein due to the depiction chosen in FIG. 2 the last-mentioned projection 160-6 is not depicted. These are also formed one-part or integrally with the hollow-truncated-conical section 140-2.

Of course, in other exemplary embodiments of a corresponding method a different embodiment of the separation or of the cut areas can be implemented. While in the exemplary embodiment shown here mutually adjacent projections 160 are thus generated, of which each one is connected to one of the two hollow-truncated-conical sections 140, these can also be formed separate from one another. In such a case, instead of the three openings 170-1, 170-2, and 170-3 shown in FIG. 2, correspondingly more openings are generated, for example six openings 170.

Likewise, of course in other exemplary embodiments of a method for manufacturing at least one synchronizing ring 150, the respective synchronizing rings can include a higher or also a lower number of corresponding projections 160, if these are to be provided at all. That is, for example, synchronizing rings 150 could thus be produced without a projection 160, with a projection 160, or any number of projections 160. With mutually adjacent projections 160, as shown in FIG. 2, the number of openings 170 typically corresponds here to the number of projections per hollow-truncated-conical section 140 or synchronizing ring 150. If the projections 160 are not embodied mutually adjacent, the number of openings 170 and thus the number of the pieces of material removed from the central region 120 of the blank 100 can correspondingly double.

Of course, in other exemplary embodiments sections 140 other than hollow-truncated-conical can also be implemented. These can have, for example, a cylindrical or otherwise-designed section along the axis of symmetry 130.

When using a blank 100 in the form of a double ring 110, using a method for manufacturing at least one synchronizing ring 150 a plurality thereof, namely two in the present exemplary embodiment, can thus be manufactured. Of course in other exemplary embodiments different blanks 100 can also be used, wherein, for example, a higher, however possibly also a lower number of synchronizing rings 150 are manufacturable. Depending thereon, such a blank 100 can also be formed differently than is shown in FIG. 1.

FIG. 2 thus shows, therefore, two synchronizing rings 150 which are also referred to as finished rings. Of course these can still be further processed, for example by a coating or another method. The synchronizing rings 150 can thus optionally also represent intermediate products or a semi-finished product.

Figure 3:
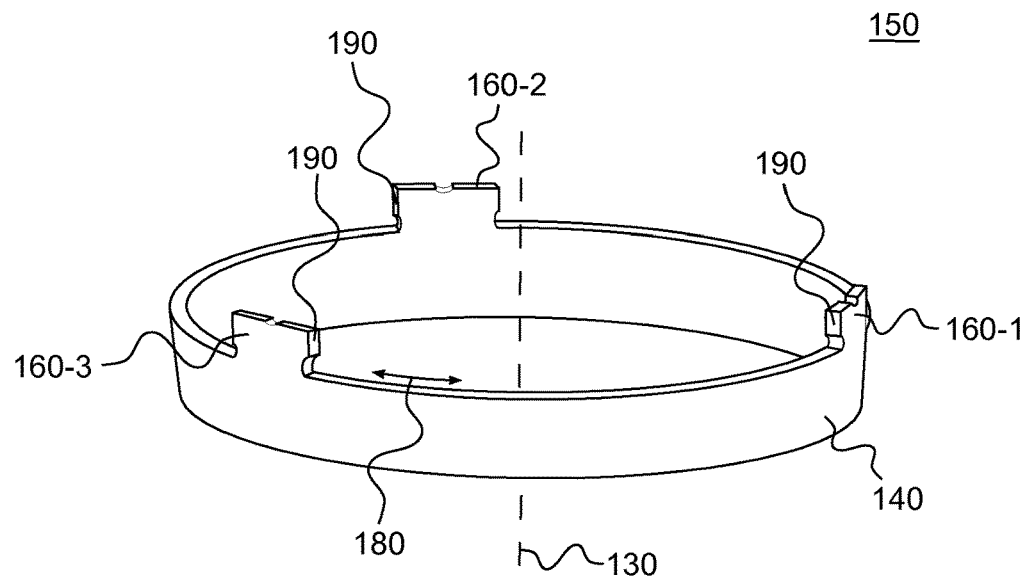
FIG. 3 shows a perspective depiction of a single synchronizing ring.

In order to better be able to illustrate mechanical loads occurring in the region of the projections 160, FIG. 3 shows a perspective depiction of an individual synchronizing ring 150 which comprises a hollow-truncated-conical section 140 and three projections 160-1, 160-2, and 160-3 connected thereto. Along a circumferential direction 180 which is perpendicular to the axis of symmetry 130, the projections 160 here each have a load surface 190 on either side of the respective projection 160, of which, however, with all three projections 160 of the synchronizing ring 150 shown in FIG. 3, in each case only a single load surface 190 is visible. Due to their arrangement on the projections 160, also referred to as lugs, the load surfaces 190 are also referred to as lug lateral surfaces.

However, during operation the synchronizing rings 150 are subjected to particular mechanical loads exactly here in the region of the load surfaces 190. Comparatively high retaining forces as well as possibly a pulsating load occur on them, which can lead to the respective projections 160 being able to be flattened-out if these have a too-low hardness. Thus if in this region the synchronizing rings 150 are embodied soft or not hardened, a damage to the synchronizing rings 150 can thus be caused whereby their service life could be significantly reduced. It is therefore often advisable, if not actually necessary, to partially harden the synchronizing rings 150 at least in the region of the load surfaces 190. These lie in the cut area of the laser-cutting.

However, since they already lie in the cut area of the laser-cutting, an appropriate hardening of the material can already result during the laser-cutting due to the use of, namely, a hardenable material for the blank 100 which is, however, not in the hardened state. In other words, for generating an appropriate hardened layer in the region of the load surfaces 190 by using an exemplary embodiment of a method for manufacturing at least one synchronizing ring 150, a hardened layer increasing the lug retaining force can optionally be generated.

Figure 4:
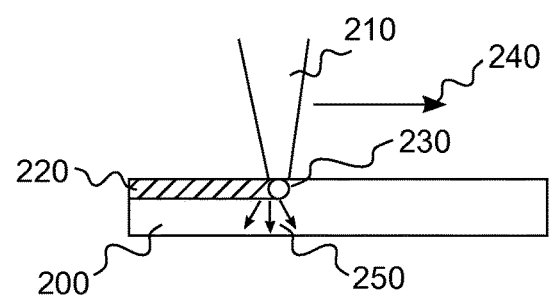
FIG. 4 illustrates a hardening using a laser (laser-hardening)

To illustrate this in more detail, FIG. 4 shows a schematic depiction of a laser-hardening. A workpiece 200, which can for example be the blank 100 during the laser-cutting, is exposed here to a laser beam 210 which impinges on a surface of the workpiece 200. A hardened surface layer 220 thereby results which is produced by a region 230 heated by the laser beam 210 when the laser beam 210 is guided along a movement direction 240 over the workpiece 200. Here the laser beam 210 often moves continuously along the movement direction 240, also referred to as the feed direction, and heats the surface layer there. In the case of a steel, the austenitization begins due to the high temperature, wherein the carbon atoms of the steel change with respect to their position in the metal lattice. In the context of a self-quenching 250, the surrounding material cools off the hot layer very quickly after a further movement of the laser beam 210. During this rapid cooling-off the metal lattice of the workpiece 200 has no possibility to revert to its initial form. Martensite results, due to which the hardness increase of the material is induced.

The synchronizing rings 150 manufactured in the context of an exemplary embodiment of a method thus include hardness zones which comprise, for example, the load surfaces 190 on the projections 160. Of course, these can also extend along on the projections 160 and be disposed circulating around the projections 160. In the simplest case, the hardness zones here can already be formed with a sufficient hardness by the heat input during the laser-cutting such that they already fulfill the requirements placed on the end product. It can thus optionally be possible to already achieve as a result of the laser-cutting the rings, manufactured from a soft material, such a structural change in the context of a martensitization as suffices to generate the required and specified retaining force in the region of the load surfaces 190 (lug retaining force). It can thus optionally already be possible to achieve a surface layer hardness during the laser-cutting such that the flattening-out of the projections 190 is prevented.

Additionally or alternatively thereto it can also optionally be possible to achieve the required structural change (martensitization) in the synchronizing ring 150 by the laser-cutting of the soft initial material using a targeted controlling of the heat input in order to again achieve the required lug retaining force and to achieve a corresponding surface layer hardness. In the context of such an exemplary embodiment it can thus be possible, for example, to irradiate the blank 100 during the laser-cutting with such energy as is greater than an amount of energy required for cutting. Thus in such an exemplary embodiment the laser-cutting can thus occur with a specific energy E which corresponds, for example, to at least 105% of a minimum specific energy required for laser-cutting of the blank 100. Here the specific energy E represents the energy per unit length which is provided by the laser to the blank 100 or to the workpiece 200 in FIG. 4 with respect to a movement speed v if the laser beam has a power P. In this case the specific energy E results as a quotient of the radiated power P and the movement speed v. It is measured in energy per unit length, i.e., for example, in J/m in SI units.

For increasing the surface layer hardness, it can optionally be advisable in other exemplary embodiments to set the specific energy E used during the laser-cutting to values of at least 110%, at least 115%, or possibly at least 120% of the maximum required specific energy for laser-cutting the blank 100.

Alternatively or additionally thereto, after the laser-cutting or after the laser-cutting process a renewed irradiating of the component, which meanwhile has substantially assumed the form of the synchronizing ring 150, can be carried out. Thus, for example, the loaded surfaces, i.e., for example, the load surfaces 190, can therefore be hardened or post-hardened in the context of a separate laser-hardening. This can occur on the same machine or machine tool, i.e., for example, the same laser-beam cutting machine. In this way it is optionally possible to omit a reclamping of the relevant component, which in turn is conducive to a simplification of the manufacturing of such a synchronizing ring 150.

An appropriate laser-hardening can comprise a defocusing of the laser beam, for example in the case wherein the laser-hardening occurs without reclamping. It can thereby be possible to harden a larger surface without undertaking adjustment of the laser power, or limiting or even completely avoiding the relevant change of the laser power. The laser-hardening is thus performed using a defocused laser beam in comparison to the laser-cutting.

Of course alternatively thereto a second optics system can be used to harden or case harden the component in the region of the loaded surfaces after the cutting by the laser beam. Of course here the surface of the component is again heated by the laser beam, wherein the laser beam continuously moves in a feed direction and heats the surface layer of the component. The high temperatures arising here in turn lead to the austenitizing and the subsequent self-quenching for forming the martensite, due to which the hardness increase is induced.

Of course in the context of an exemplary embodiment of a method, the laser beam hardening of soft laser-cut or stamped synchronizing rings can optionally also be carried out on a separate system. Even with this, the surface layer hardness is effected such that the surface is heated again by the laser beam and the processes already described above are effected in the hardenable material, i.e., for example, in the hardenable steel.

By using an exemplary embodiment of a method for manufacturing at least one synchronizing ring 150 it can thus optionally be possible to manufacture the synchronizing rings such that these have a roundness shape tolerance of at most 100 µm. In other exemplary embodiments it can optionally even be possible to fall below the aforementioned value, i.e., for example, to achieve a roundness of at most 90 µm, of at most 80 µm, of at most 70 µm, of at most 60 µm, of at most 50 µm, or at most 40 µm. The aforementioned values can then make it possible, for example, to reach the specified and required values of such a synchronizing ring 150 with a coating which can optionally also be carried out. Carbon coats or carbon-based coats can be used, for example, as a coat which can be applied in the context of such an optional coating.

Figure 5:
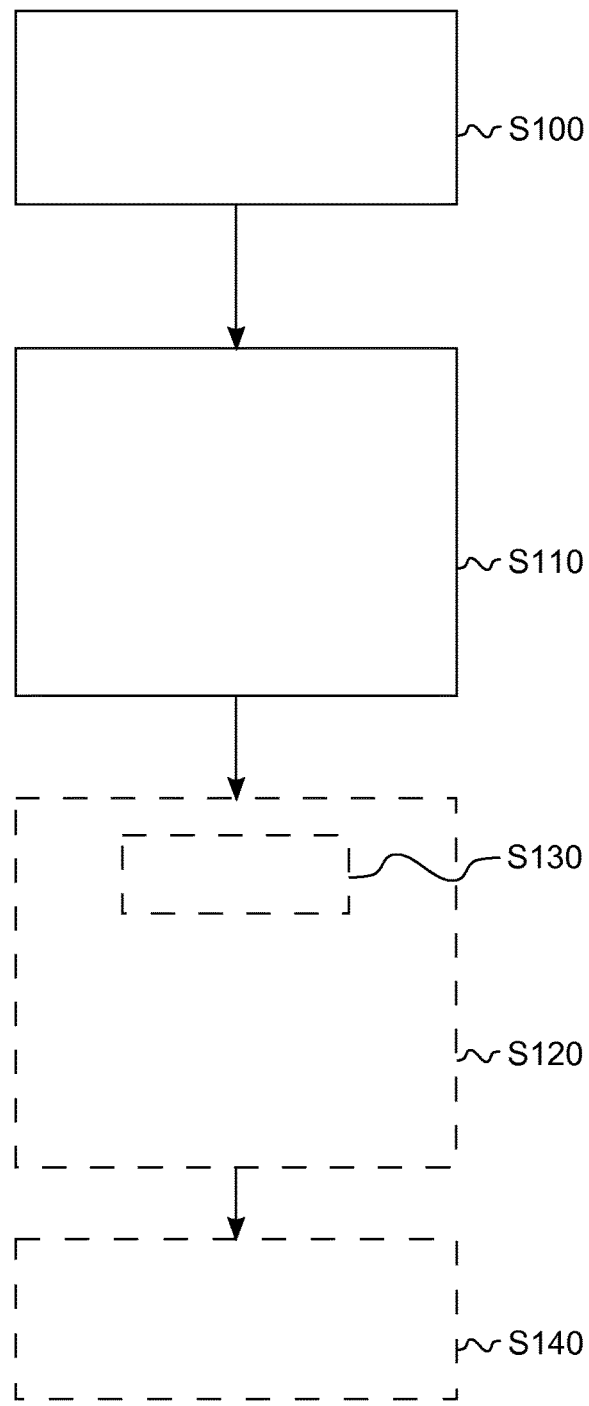
FIG. 5 shows a flow diagram of a method for manufacturing at least one intermediate ring according to an exemplary embodiment.

Finally FIG. 5 shows a flow diagram of a method for manufacturing at least one synchronizing ring 150. Initially in the context of a step S100 a rough-turned blank 100 made from a hardenable material is provided, wherein, however, the blank 100 is in a not-hardened state. Subsequently in the context of a step S110 the provided blank 100 is laser-cut in order to obtain at least one form of the at least one synchronizing ring 150. The hardenable material can thereby optionally be hardened in a cut area of the laser-cutting. The laser-hardening thus generally occurs here only partially. Here the hardening can further occur optionally in the region of the load surfaces 190 already explained above in the cut area of the laser-cutting, wherein the load surfaces extend perpendicular to the circumferential direction 180, which generally stands perpendicular to the axis of symmetry 130 of the later synchronizing ring or of the blank 100.

In the ideal case the synchronizing ring 150 here has at least sectionally a complete rotational symmetry. If, however, the synchronizing ring 150 is considered as a whole, due to the projections 160 it can result that this only has a whole-number rotational symmetry. Of course, in the context of an exemplary embodiment of such a method such synchronizing rings 150 can also be manufactured which have no corresponding rotational symmetry.

Here the laser-cutting can optionally occur with such a specific energy E that corresponds to at least 105% or at least one of the ratios already mentioned above based on the minimum specific energy required for laser-cutting the blank. In this way it can already be possible in the context of the laser-cutting (step S110) to achieve the appropriate hardening of the hardenable material in the load surfaces 190 or other loaded surfaces. A hardening can thus already result during the laser-cutting of the appropriate hardening zones. Alternatively or in addition thereto, a laser-hardening can also occur in a separate step S120. This can occur, for example, without reclamping on the same machine or same machine tool, i.e., in particular on the same laser-cutting machine or laser-hardening machine. Here a use of a second optics system and thus optionally of a second laser can optionally be spared if the laser optics used for laser-cutting are defocused in an optional step S130 such that the laser-hardening (step S120) occurs with a laser beam defocused in comparison to the laser-cutting (step 110).

Optionally in the context of a step S140 a coating can occur with an appropriate coat, for example a carbon coat or a carbon-based coat. This can occur, for example, also even already before the laser-cutting in step S110.

Here the laser-cutting represents a separating process, wherein heat is added which ensures that the material of the blank 100 is melted in this region and removed by an appropriate process gas. A normal laser-cutting can thus be implemented in the context of an exemplary embodiment. Thus, for example, a carbon dioxide laser ($CO_2$ laser) or Nd:YAG laser can be used as the laser, to name only two different types of lasers.

A heat treatment is already effected by this heat input on the cut surfaces, which produces a greater degree of hardness up to a certain depth (hardening depth) in the respective initial material. Cutting with a higher energy, i.e. a higher laser power P and/or a lower cutting speed v than is necessary for the actual laser-cutting thereby increases the corresponding surface hardening zone, e.g., the hardening depth. The hardness depth can also optionally be increased by using a different process gas. If necessary, the hardness depth can thus be increased, for example, by using oxygen instead of the nitrogen often used as cutting gas.

Should it be necessary, in order, for example, to fulfill certain requirements, to increase the hardness, the hardness depth, or resistance further than using the laser-cutting process alone, it can thus optionally be possible to follow up with an additional treatment using a laser beam on the same machine tool or on a separate machine tool, wherein the process of the laser-hardening as such represents a known technology.

If it is necessary or advisable, another simple heat treatment step, a so-called tempering, can optionally further be carried out, using which the structure of the workpiece can be stabilized if this could be advisable due to a hardening depth of the hardness zone. Here the component, i.e., for example, the synchronizing ring 150 can be heated enough that distribution of mechanical stresses or even an appropriate restructuring occurs. In this case the component is typically less-strongly heated than is the case with laser-hardening.

A treatment or surface treatment of the blank 110 can optionally also be carried out before the laser-cutting in step S110, in whose context a treatment layer, for example a paint, is applied or sprayed-on. An absorption behavior of the laser beam 210 on the blank 110 can thereby optionally be improved, by, for example, reducing a reflection thereof. This can be achievable, for example, by applying a paint. In such a case the relevant layer can optionally be removed from the now-cut component again immediately after the laser-cutting or also at a later point in time.

Exemplary embodiments of a method for manufacturing at least one synchronizing ring 150 can thus implement a cost reduction such that, for example, due to the use of a rough-turned blank made from a hardenable material, which, however, is not in the hardened state, and the use of the laser-cutting, a vibratory finishing of the blank or of the later product can be spared. Such a product can, for example, be implemented in an industrialized manner in a cost-efficient manner with quite high quantities of a plurality of millions of components per year. In exemplary embodiments an appropriate laser-heat treatment can thus be implemented in a simple manner, wherein a manufacturing of corresponding synchronizing rings 150 already comprises a laser-cutting. Here it can optionally be advisable to provide the relevant blank in a separate manner.

Exemplary embodiments of a method for manufacturing at least one synchronizing ring 150 can thus make possible a cost-efficient manufacturing thereof, wherein the synchronizing rings 150 are in the situation to be finished using a surface coating. In the method described here this can be realized since due to the use of the double ring 120, in the step of the laser-cutting S110 two synchronizing rings 150 are manufacturable per work cycle without a separate heat treatment possibly having to be provided. It can thereby be possible to cope with tool costs due to the use of the laser-cutting in comparison to tool costs for a corresponding stamping tool for production of corresponding soft blanks 100 or preliminary steps of the synchronizing ring 150.

Exemplary embodiments of such a method for manufacturing at least one synchronizing ring 150 thus make use of the fact that with the laser-cutting, a heat treatment only occurs in the region of the functional surfaces, i.e. only where an increased hardness is only needed during later operation. Post-processing steps can thereby possibly be spared. Likewise, such a process can optionally be very quickly adaptable, since due to the use of laser-cutting a tool manufacturing is omitted and thus a full flexibility with respect to realizable forms is possible.

Exemplary embodiments likewise comprise a corresponding program including a program code for performing a process according to an exemplary embodiment when this runs on a programmable hardware component, for example a machine tool, and here in particular on a laser-cutting machine or a laser-hardening machine. Here the individual method steps can be performed by actuators which the program implements by controlling the same. Here the controlling can occur by a writing of data in registers or other storage locations. The same applies for a receiving or reading.

By using an exemplary embodiment it can be possible to provide a simpler method for manufacturing a synchronizing ring.

The features disclosed in the foregoing description, the following claims, and the accompanying Figures can be meaningful and can be implemented both individually as well as in any combination for the realization of an exemplary embodiment in its various embodiments.

Although some aspects of the present invention have been described in the context of a device, it is to be understood that these aspects also represent a description of a corresponding method, so that a block or a component of a device is also understood as a corresponding method step or as a feature of a method step. In an analogous manner, aspects which have been described in the context of or as a method step also represent a description of a corresponding block or detail or feature of a corresponding device.

Depending on certain implementation requirements, exemplary embodiments of the invention may be implemented in hardware or in software. The implementation can be performed using a digital storage medium, for example a floppy disk, a DVD, a Blu-Ray disc, a CD, a ROM, a PROM, an EPROM, an EEPROM or a flash memory, a hard drive or another magnetic or optical storage device, on which electronically readable control signals are stored, which interact or can interact with a programmable hardware component such that the respective method is performed.

A programmable hardware component can be formed by a processor, a computer processor (CPU=central processing unit), a graphics processor (GPU=graphics processing unit), a computer, a computer system, an application-specific integrated circuit (ASIC), an integrated circuit (IC), a system-on-a-chip (SOC), a programmable logic element, or a field programmable gate array (FPGA) including a microprocessor.

The digital storage medium can therefore be machine- or computer readable. Some exemplary embodiments thus comprise a data carrier which includes electronically-readable control signals which are capable of interacting with a programmable computer system or a programmable hardware component such that one of the methods described herein is carried out. An exemplary embodiment is thus a data carrier (or a digital storage medium or a computer-readable medium) on which the program for performing one of the methods described herein is recorded.

In general, exemplary embodiments of the present invention are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A further exemplary embodiment is a data stream, a signal sequence, or a sequence of signals which represents the program for performing one of the methods described herein. The data stream, the signal sequence, or the sequence of signals can for example be configured to be transferred via a data communications connection, for example via the Internet or another network. Exemplary embodiments are thus also signal sequences which represent data, which are intended for transmission via a network or a data communications connection, wherein the data represent the program.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, or magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using actuators.

The above-described exemplary embodiments represent only an illustration of the principles of the present invention. It is understood that modifications and variations of the arrangements and details described herein will be clear to other persons of skill in the art. It is therefore intended that the invention be limited only by the scope of the following patent claims, and not by the specific details which have been presented with reference to the description and the explanation of the exemplary embodiments.

The invention claimed is:

1. A method for manufacturing at least one synchronizing ring, comprising:
   providing a rough-turned blank made from a hardenable material, wherein the rough-turned blank is provided in a not-hardened a state;
   laser-cutting the rough-turned blank to provide at least one form of the at least one synchronizing ring, the laser-cutting comprises a targeted increase of a specific energy with respect to a minimum specific energy required for the laser-cutting thereby hardening the hardenable material; and
   a laser-hardening following the laser-cutting, wherein the laser-hardening comprises a defocusing of a laser optics system, so that the laser-hardening occurs with a defocused laser beam in comparison to the laser-cutting.

2. The method according to claim 1, wherein the laser-cutting comprises hardening the hardenable material in a region of the laser-cutting.

3. The method according to claim 2, comprising laser-cutting the synchronizing ring to form at least one loading surface extending perpendicular to a circumferential direction.

4. The method according to claim 1, which method occurs without vibratory finishing, and/or wherein the providing of the rough-turned blank comprises a vibratory-finishing-free providing of the rough-turned blank.

5. The method according to claim 1, wherein the laser-cutting comprises laser-cutting with the specific energy which corresponds to at least 105% of the minimum specific energy required for laser-cutting the rough-turned blank.

6. The method according to claim 1, wherein the laser-hardening occurs without reclamping.

7. The method according to claim 1, wherein the manufacturing of the at least one synchronizing ring occurs such that the at least one synchronizing ring has a roundness shape tolerance of at most 100 μm.

8. The method according to claim 1,
   further comprises a laser-hardening following the laser-cutting,
   wherein the laser-cutting comprises laser-cutting with the specific energy which corresponds to at least 105% of the minimum specific energy required for laser-cutting the rough-turned blank,
   wherein the laser-hardening occurs without reclamping, wherein the laser-hardening comprises a defocusing of a laser optics system, so that the laser-hardening occurs with a defocused laser beam in comparison to the laser-cutting, and wherein the manufacturing of the at least one synchronizing ring occurs such that the at least one synchronizing ring has a roundness shape tolerance of at most 100 μm.

9. A method for manufacturing at least one synchronizing ring, comprising:

providing an annular blank comprising a hardenable material in a not-hardened state; and laser-cutting the annular blank to form the at least one synchronizing ring, the laser cutting using a specific energy at least 5% greater than a minimum energy required for the laser cutting, the specific energy being selected to harden a greater region of the annular blank than would have been hardened using the minimum energy required for the laser cutting;

a laser-hardening at least a portion of the synchronizing ring following the laser-cutting, wherein the laser-hardening comprises a defocusing of a laser optics system, so that the laser-hardening occurs with a defocused laser beam in comparison to the laser-cutting.

10. The method according to claim 9, wherein laser cutting the annular blank comprises laser cutting the annular blank to form at least one loading surface in the synchronizing ring, the at least one loading surface extending perpendicular to a circumferential direction of the at least one synchronizing ring.

11. A method for manufacturing at least one synchronizing ring comprising:

providing an annular blank comprising a hardenable material in a not-hardened state;

clamping the annular blank in a clamp;

laser cutting the annular blank to form the at least one synchronizer ring, the laser cutting including forming at least one projection on the synchronizing ring having a loading surface extending perpendicular to a circumferential direction of the at least one synchronizing ring, the laser-cutting comprises a targeted increase of a specific energy with respect to a minimum specific energy required for the laser-cutting thereby hardening the hardenable material; and after the end of the laser cutting the annular blank, and without removing the annular blank from the clamp, laser hardening at least a portion of the annular blank while the annular blank is held in the clamp, wherein the laser hardening comprises laser hardening with the same laser used for the laser cutting, wherein the laser hardening comprises defocusing the laser.

12. The method according to claim 11, wherein the laser cutting comprises laser cutting using the specific energy at least 5% greater than the minimum energy required for the laser cutting, the specific energy being selected to harden a greater region of the annular blank than would have been hardened using the minimum energy required for the laser cutting.

* * * * *